United States Patent [19]

Spodig

[11] 4,196,639
[45] Apr. 8, 1980

[54] FRICTION GEAR PERMANENT MAGNETIC ENTRAINMENT MEANS

[76] Inventor: Heinrich Spodig, 4714 Selm-Bork, Netteberge 202, Fed. Rep. of Germany

[21] Appl. No.: 883,967

[22] Filed: Mar. 6, 1978

[30] Foreign Application Priority Data

Mar. 23, 1977 [DE] Fed. Rep. of Germany ....... 2712720

[51] Int. Cl.² ............................................. F16H 13/12
[52] U.S. Cl. ................................... 74/210; 74/DIG. 4
[58] Field of Search ................ 209/215, 219–223; 210/222, 223; 335/306; 74/210, DIG. 4

[56] References Cited

U.S. PATENT DOCUMENTS

| 2,177,809 | 10/1939 | Queneau | 209/219 |
| 2,951,387 | 9/1960 | Cox | 74/210 |
| 3,948,766 | 4/1976 | Spodig | 209/219 |

FOREIGN PATENT DOCUMENTS 776310  6/1957  United Kingdom ..................... 74/210

Primary Examiner—Ralph J. Hill
Attorney, Agent, or Firm—Wallenstein, Spangenberg, Hattis & Strampel

[57] ABSTRACT

A friction gear permanent magnetic entrainment means for rolling transmission of motion in combination with a magnetic-technical system having one magnetic circuit comprising at least two magnets and at least one operating air gap, including a frame being composed of symmetrically arranged permanent magnets and symmetrically arranged mild iron or steel parts, with the mild iron or steel parts arranged between analogous poles of the magnets forming central frontal surfaces drawn into the interior of the frame, which central frontal surfaces are opposing one another forming an operating air gap with opposite polarities in the direction of magnetizing.

16 Claims, 16 Drawing Figures

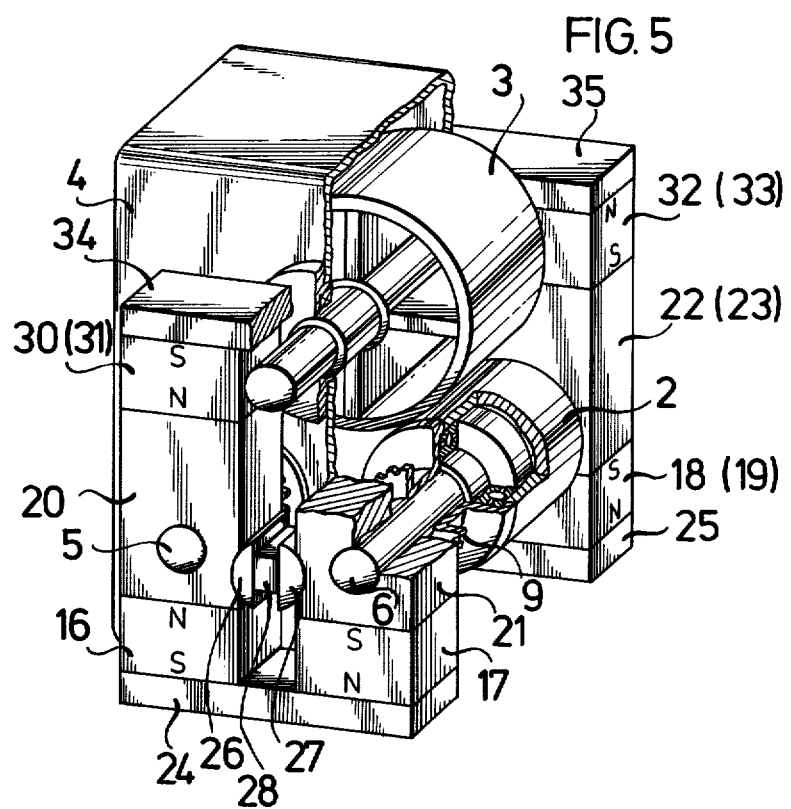

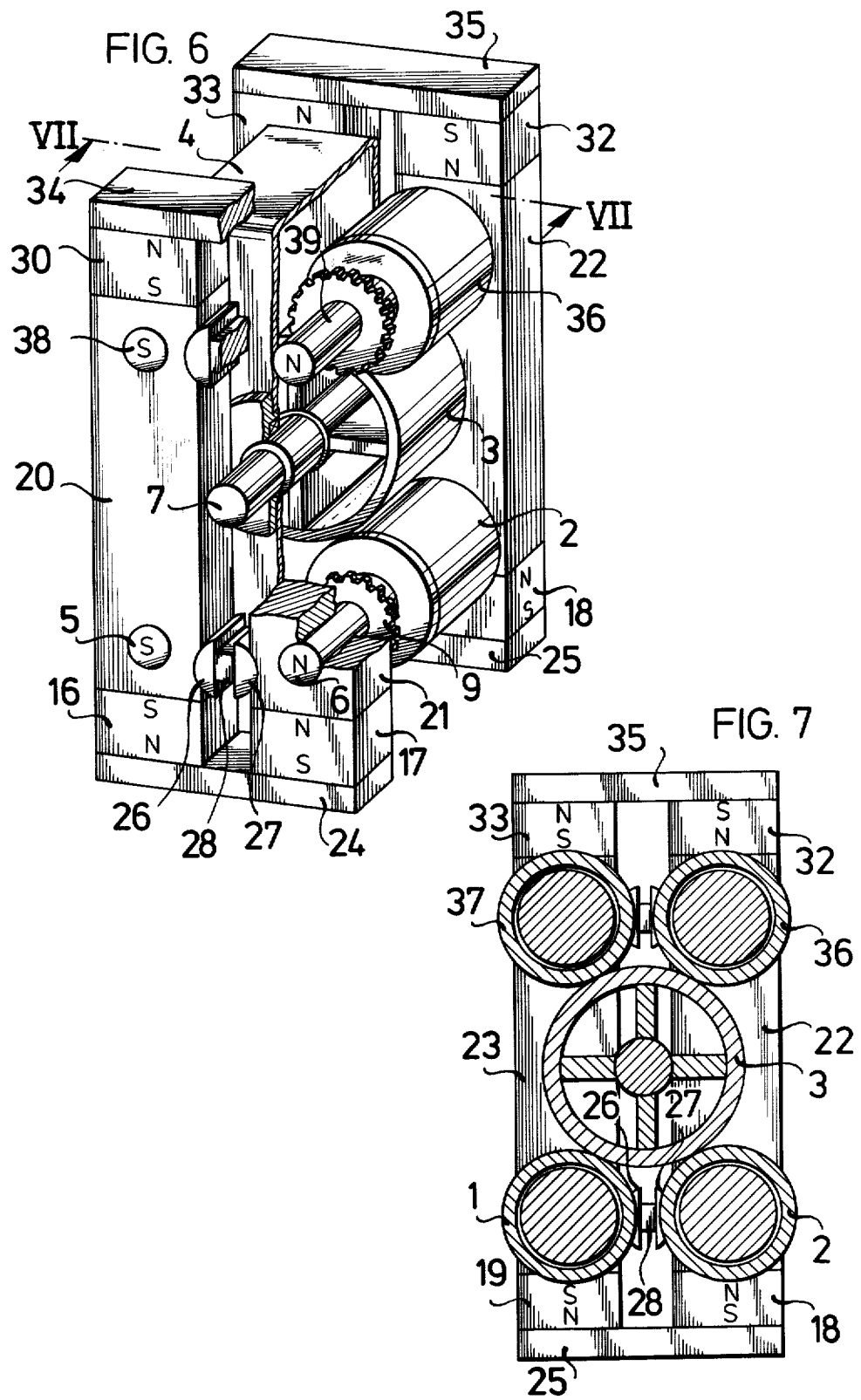

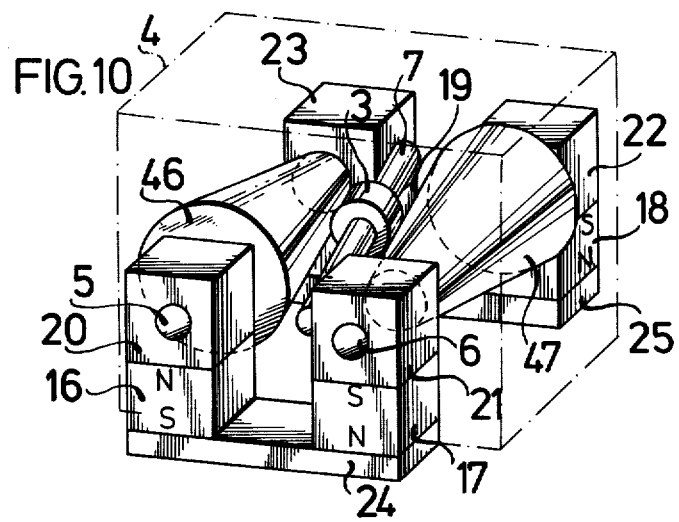
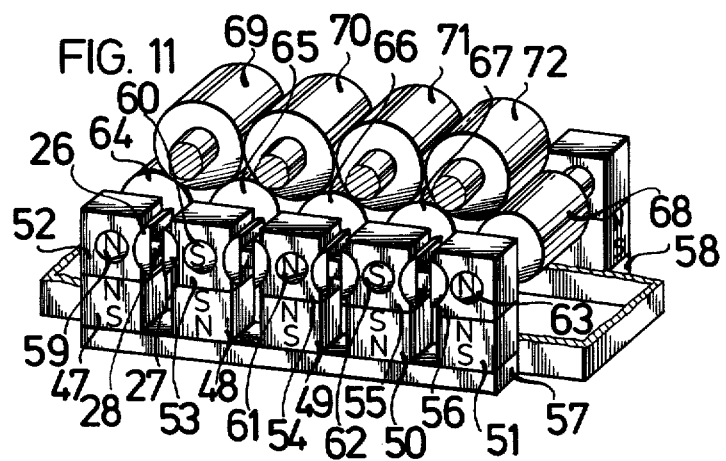
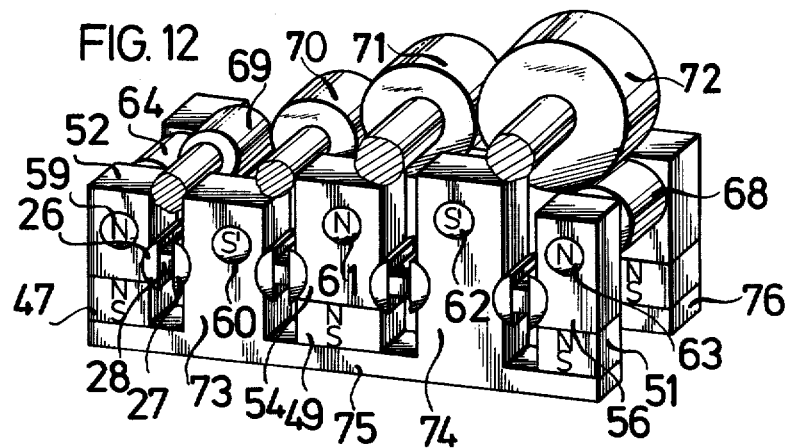

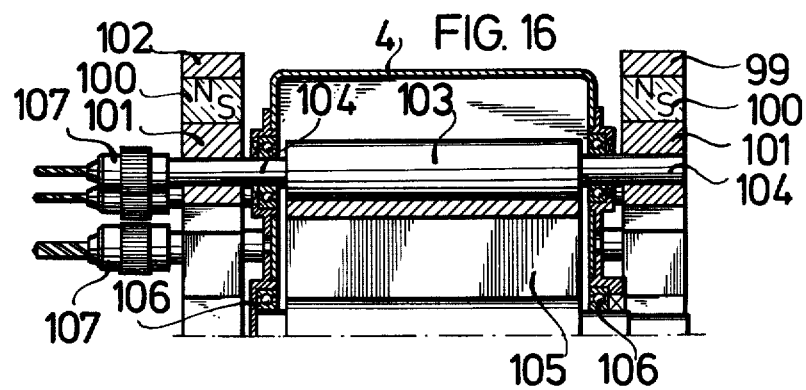

FRICTION GEAR PERMANENT MAGNETIC ENTRAINMENT MEANS

BACKGROUND OF THE INVENTION

My copending application Ser. No. 867,217 filed Jan. 6, 1978 (continuation of application Ser. No. 766,352 filed Feb. 7, 1977) relates to magnetic-technical systems useful in magnetic separators for separating magnetic materials from liquid or dry materials containing magnetic particles. The magnetic-technical systems are characterized by possessing one magnetic circuit comprising at least two magnets and at least one operating air gap, and being further characterized by the fact that the circuit containing the magnets is closed and that within said circuit there is an operating gap in relation to two mild iron or steel parts which in each case are arranged between two interconnected homopolar magnets.

The present invention relates to a friction gear permanent magnetic entrainment means for rolling transmission of motion in combination with the magnetic-technical system as defined in my forementioned application Ser. No. 867,217.

Mechanically effective friction gears have been known for the most different purposes for years (see LUEGER, "Lexikon der Technik", 4th edition, 1960, vol, 1, pp. 416 to 418).

Magnetic friction gears have profited from the principles and constructional features of the known mechanical friction gears. While the friction efficiency of simple friction gears with magnetic adhesion was fairly satisfactory, strong fields appeared at the magnetic operating air gap (edge effect) besides diminishing magnetic fields, due to the forming of different magnetic potential areas. This occurs for instance in case of friction gears with magnetic contact pressure where the magnets on the one hand partly surround the friction wheels with an air gap and are on the other hand connected to one another by a short-circuit element as disclosed in my German Pat. No. 10 59 734. Due to these air gaps the magnetic circuit is not completely closed. This is due to the fact that nonuniform magnetic potential areas occur at the free poles of the permanent magnets and at the induced friction gears. As a result this leads to increased ferromagnetic wear which may entail a blocking of the friction gear.

In the application Ser. No. 867,217 a magnetic-technical system having one magnetic circuit comprising at least two magnets and at least one operating air gap has been proposed characterized by a frame being composed of symmetrically arranged permanent magnets and symmetrically arranged mild iron or steel parts with the mild iron or steel parts arranged between analogous poles of the magnets forming central frontal surfaces drawn into the interior of the frame, which central frontal surfaces are opposing one another forming an operating air gap with opposite polarities in the direction of magnetizing. With such a closed circuit the lines of force are concentrated to the and in the operating air gap in a practically completely homogenically magnetized way so that the outer stray fields are kept small and magnetic dispersions within the yoke as well as outside the effective area are widely avoided.

As compared to known magnetic systems, a system with considerably less dispersion is reached largely preventing outer stray and producing a stronger homogenic magnetic field in the operating air gap.

The present invention proposes the application of that new magnetic-technical system to friction gears with permanent magnetic entrainment or adhesion, resulting in the fact that nonuniform magnetic potential areas are avoided at the free poles of the permanent magnets and at the induced friction wheels of the friction rollers. As thus for instance rotating friction wheels placed in a common frame and pivoted on adjustable axes can produce oppositely polarized parts of a magnetic circuit closing the magnetic system, it is possible to arrange outside the frame block magnets with pole shoes of practically unlimited size and thus to achieve adhesive forces also with larger gaps for the entrainment of the friction wheels, having been regarded as inachievable until now.

Further developments, details applications and advantages of the invention are set forth in connection with preferred embodiments of the invention as shown in the accompanying drawings wherein FIG. 1 shows a partly sectional diagram of a friction gear with two drive rollers and one off-drive roller as well as a magnetic system comprising two block magnets, FIG. 2 shows a sectional view of the friction gear along line II—II of FIG. 1, FIG. 3 shows a partly sectional diagram of a friction gear comprising two drive rollers and one off-drive roller as well as a magnetic system having more than two block magnets, FIG. 4 shows a sectional view of the friction gear along line IV—IV of FIG. 3, FIG. 5 shows a partly sectional diagram of a friction gear comprising two drive rollers and one off-drive roller as well as a further modified magnetic system, FIG. 6 shows a partly sectional diagram of a friction gear comprising four drive rollers and one off-drive roller, FIG. 7 shows a sectional view of the friction gear along line VII—VII of FIG. 6, FIG. 8 shows a partly sectional diagram of a friction gear comprising three drive rollers and one off-drive roller as well as a magnetic system with auxiliary poles and switching elements, FIG. 9 shows a sectional view of the friction gear along line IX—IX of FIG. 8, FIG. 10 shows a diagram of a friction gear comprising conical drive rollers and a cylindrical off-drive roller, FIG. 11 shows a diagram of a friction gear comprising a plurality of drive rollers and off-drive rollers as well as a magnetic system comprising a corresponding number of block magnets, FIG. 12 shows a diagram of a friction gear according to FIG. 11 with magnetic and auxiliary poles of different height as well as off-drive rollers of different diameter, FIG. 13 shows a partly sectional diagram of a friction gear comprising a displaceable pole shoe, FIG. 14 shows a sectional view of the friction gear along line XIV—XIV of FIG. 13, FIG. 15 shows a partly sectional diagram of a friction gear comprising a central drive roller and several off-drive rollers rolling on the drive roller as well as a magnetic system consisting of polygonal short-circuit plates being provided with a number of block magnets corresponding to the drive rollers, FIG. 16 shows a sectional view of the friction gear along line XVI—XVI of FIG. 15.

DETAILED DESCRIPTION

Figure 1:
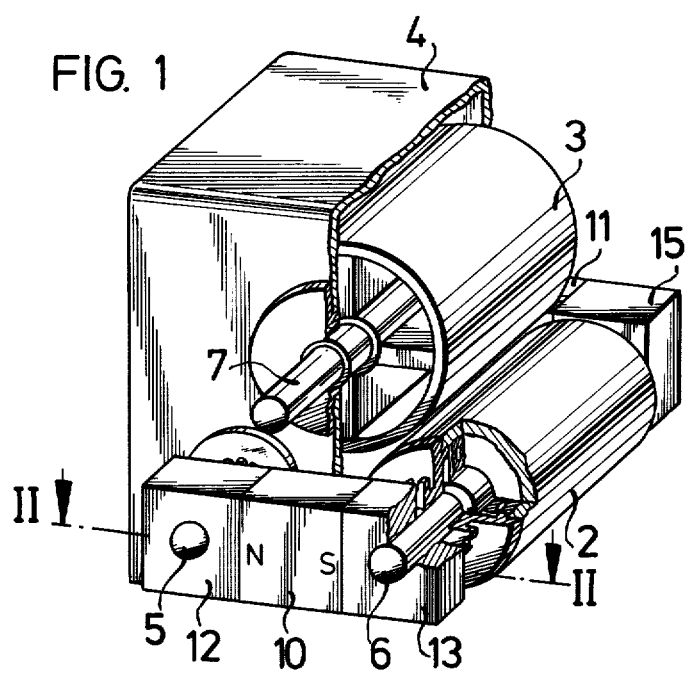
Figure 2:
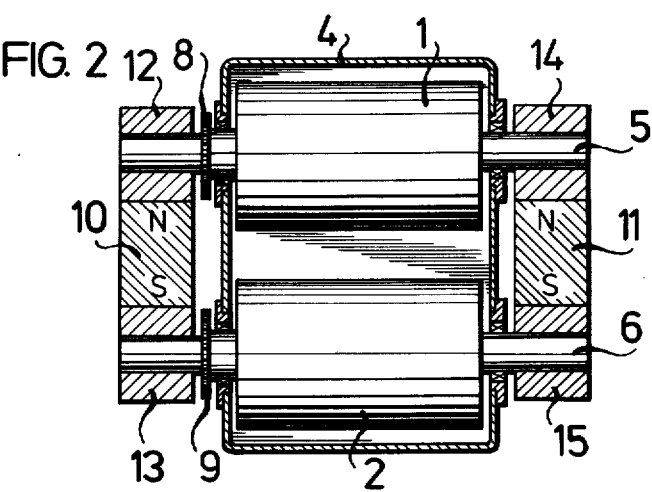

The friction gear according to FIGS. 21, comprises the ferrous drive rollers 1, 2 and the ferrous off-drive roller 3. Rollers 1, 2, 3 are completely surrounded by a casing 4. The drive rollers 1, 2 are supported within the casing 4 in bearings on adjustable axes 5, 6 while the off-drive roller 3 is secured to a shaft 7 being likewise supported in bearings in the frontal walls of the casing 4 opposite the roller 3. At one frontal side the drive rollers 1, 2 are provided with gear wheels 8, 9 through which they are driven by a drive (not shown) for instance a motor and a common chain. Instead of a chain drive, a gear drive can be provided for within or outside the casing. The axes 5, 6 of the drive rollers 1, 2 are oppositely polarized socalled magnet axes of a magnetic circuit closing the magnetic system, with part of them being disposed outside the casing 4 together with the further elements of the magnetic system. The further elements of the magnetic system are block magnets 10, 11 being polarized in parallel to the plane of axis of rollers 1, 2 with pole shoes 12, 13, 14, 15 being mounted on both sides of the frontal surfaces of the drive rollers 1, 2 and secured to the axes 5, 6 by the pole shoes 12, 13, 14, 15. This gives a completely closed magnetic circuit being practically free of stray, originating from the block magnets 10, 11 and extending through the pole shoes 12, 13, 14, 15 and through the axes 5, 6. The lines of force of the magnetic circuit are exclusively concentrated within the operating air gap in the interior of the circuit between rollers 1, 2, and the magnetic circuit is closed by means of off-drive roller 3 being supported on rollers 1, 2 which results in a strong mutual magnetic attraction of rollers 1, 2, 3 and a simultaneous partly relief of the bearings by means of mutual magnetic support, as well as force-locking transmission of the torque. Due to the arrangement of the block magnets 10, 11 and of the pole shoes 12, 13, 14, 15 outside the casing 4 they can be arranged in practically any possible size. Thus auxiliary forces for the entrainment of rollers 1, 2, 3 can be achieved which could not be reached until now.

Figure 3:
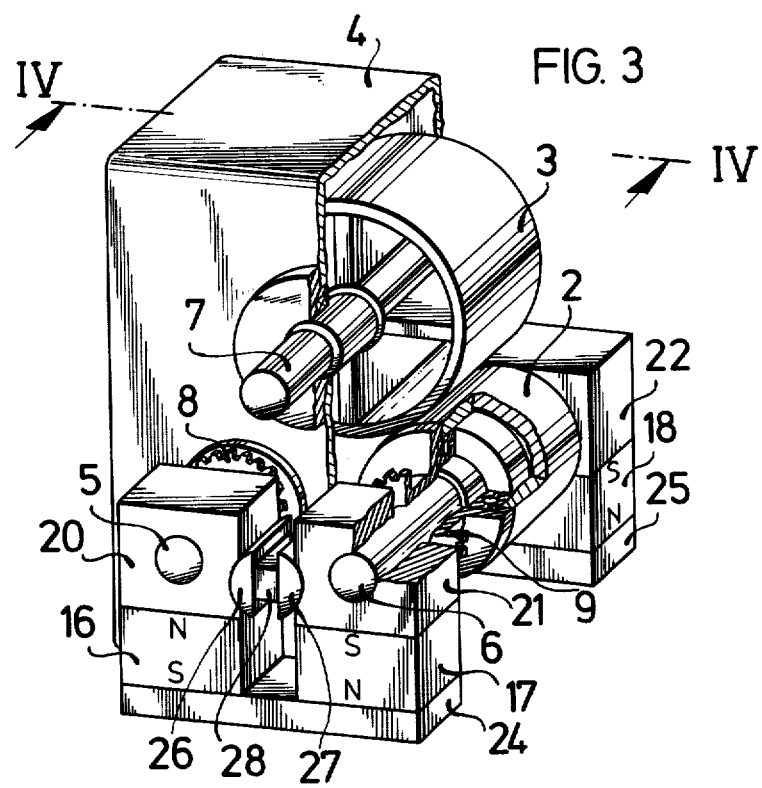

FIG. 3 shows a friction gear being similar to that of FIG. 1, however, provided with a reinforced and with a connectable and disconnectable magnetic system. In this case, on both sides of the frontal surfaces of drive rollers 1, 2 block magnets 16, 17, 18, 19 with pole shoes 20, 21, 22, 23 are disposed in pairs outside the casing 4, said block magnets being oppositely magnetized to one another vertically to the plane of axis of drive rollers 1, 2 and connected by one short-circuit element 24, 25 each at the surface opposite the pole shoes 20, 21, 22, 23. The block magnets 16, 17 and their pole shoes 20, 21 respectively are connected to the correspondingly polarized block magnets 18, 19 and their pole shoes 22, 23 respectively via the thus oppositely polarized axes 5, 6 so that also in this case the magnetic circuit is completely closed within the casing 4. The operating air gap again lies between the drive rollers 1, 2. It is also closed by means of the superposition of off-drive roller 3 so that this system is practically free of stray.

By means of a switching element being disposed between the pole shoes 20, 21 and 22, 23 and consisting of the two segments 26, 27 conveying the magnetism, and an unmagnetized circuit breaker 28 connecting the segments 26, 27 to form a rotor, the magnet pairs 16, 17 and 18, 19 can be short-circuited via their pole shoes 20, 21 and 22, 23. The axes 5, 6 then become practically ummagnetized and the magnetic adhesion of the drive rollers 1, 2 with the off-drive roller 3 is neutralized. The neutralization of the magnetic adhesion can be desirous for repairs or disassemblies of the friction gear. In addition, the magnetic capacity can be adjusted via the switching elements 26, 27, 28 from 0 up to the maximum magnetic force depending on the position of the swiching elements 26, 27, 28, i.e. that the magnetic transmission of force is variable.

Figure 4:
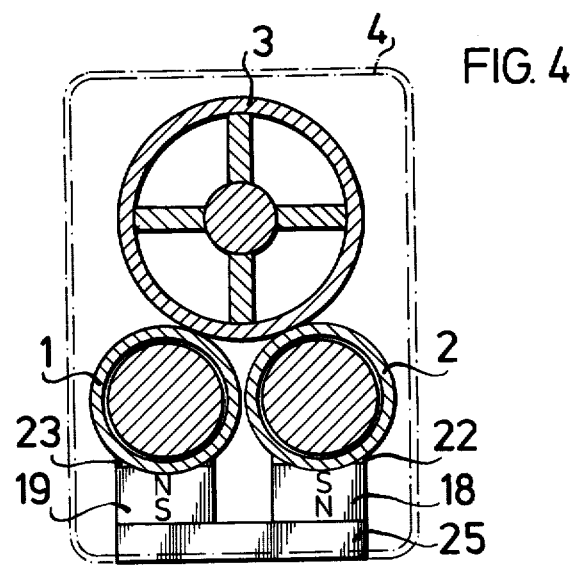

For increasing the magnetic induction the distance between the drive rollers 1, 2 and thus the air gap can be reduced so that they are closely adjacent to one another with their peripheries, see FIG. 4.

In case of the friction gear of FIG. 5 the magnetic system for drive rollers 1, 2 and off-drive roller 3 is even reinforced by an increased operating air gap induction by arranging on the pole shoes 20, 21, 22, 23 additional block magnets 30, 31, 32, 33 with analogous poles, their free poles also being connected to short-circuit plates 34, 35. The short-circuit plates 24, 25 and 34, 35 respectively can also be connected to one another because of constructional reasons. The course of the magnetic lines of force within the magnetic circuit remains unchanged by this.

The friction gear of FIG. 5 can be further modified according to FIGS. 6 and 7 by providing above the off-drive roller 3 two further drive rollers 36, 37 instead of two drive rollers 1,2. The bearing of these rollers 36, 37 by axes 38, 39 lies also within the casing 4. In addition, the axes 38, 39 are in connection with the pole shoes 20, 21, 22, 23 so that they are correspondingly polarized. Besides the increase of the driving force on the off-drive roller 3 by means of the arrangement of the drive rollers 1, 2, 36, 37 to the off-drive roller 3 being symmetrical in both directions of the axes, also a practically complete relief of the bearings and thus a reduction of the friction values can be achieved by means of the embodiment of the friction gear.

Figure 8:
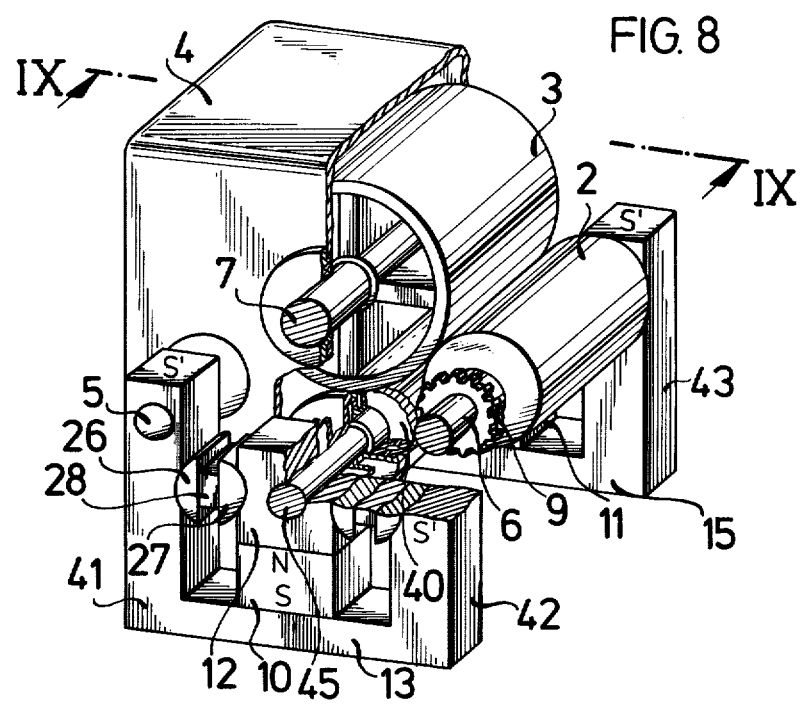
Figure 9:
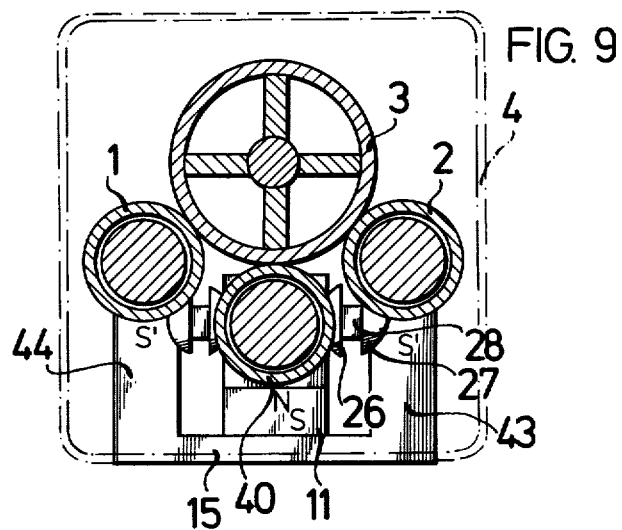

According to FIG. 8 the friction gear can be formed in such a way that it operates with three drive rollers. In modification of the friction gear of FIG. 1 the pole shoes 13, 15 are then U-shaped with the legs 41, 42, 43, 44 forming auxiliary poles to which the two axes 5, 6 of the outside drive rollers 1, 2 disposed within the casing 4 are connected and are correspondingly oppositely polarized to the axis 45 of the drive roller 40. While the axes 5, 6, 45 again constitute the elements of a closed magnetic circuit, the drive rollers 1, 2, 40 are magnetically short-circuited by the off-drive roller 3 being in direct touch with them, and mutually attracted by the magnetic adhesion.

Instead of cylindrical drive rollers, those of a conical form can be used together with a friction wheel or a drive roller being disposed therebetween, see FIG. 10. Here, the magnetic system of FIGS. 3 and 4 is taken as a basis. The conical drive rollrs 46, 47' are with their axes 5, 6 also mounted within the casing 4 and connected to the pole shoes 20, 21, 22, 23 of the block magnets 16, 17, 18, 19 being connected to one another in pairs by means of the short-circuit plates 24, 25. The conicity of drive rollrs 46, 47' with one another is opposite, while the cylindrical off-drive roller 3 being disposed between the drive rollers 46, 47' and lying with its axis 7 also within the casing 4, is displaceable on the drive rollers 46, 47' with continuous modification of the rotational speed.

FIG. 11 shows a friction gear with more than two drive rollers and more than one off-drive roller. The magnetic system on both sides of the rollers consists of an uneven number of block magnets 47, 48, 49, 50, 51 with pole shoes 52, 53, 54, 55, 56. At each side of the friction gear the block magnets 47, 48, 49, 50, 51 are connected to one another by a short-circuit plate 57, 58, and magnetized oppositely to one another in the vertical plane of axis. Thus the axes 59, 60, 61, 62, 63 being again disposed in a closed magnetic circuit obtain alternating polarities together with the drive rollers 64, 65, 66, 67, 68 with adjacent drive rollers forming an operating air gap between one another. Due to the supported off-drive rollers 69, 70, 71, 72 the operating air gaps are magnetically short-circuited so that the drive rollers 64, 65, 66, 67, 68 and the off-drive rollers 69, 70, 71, 72 are under strong mutual magnetic attraction.

As in the above examples the drive rollers 64, 65, 66, 67, 68 are driven by a common drive, for instance a motor via chain wheels or a common chain or gear wheels, as well as mounted in a common casing together with the off-drive rollers 69, 70, 71, 72, whereby outside said casing the connectable and disconnectable magnetic system is disposed with its block magnets 47, 48, 49, 50, 51 with pole shoes 52, 53, 54, 55, 56. Due to this increased number of drive rollers 64, 65, 66, 67, 68 and off-drive rollers 69, 70, 71, 72 the friction gear is of particular advantage for the simultaneous execution of several working operations with multiple drills.

According to FIG. 12 the magnetic system of FIG. 11 is modified so that every second block magnet 48, 50 is replaced by an auxiliary pole 73, 74. Instead of a short-circuit plate the block magnets 47, 49, 51 with analogous poles are mounted on pole plates 75, 76 with the auxiliary poles 73, 74 extending up to the block magnets 47, 49, 51 and their pole shoes 52, 54, 56 respectively, and operating as corresponding antipoles. The use of auxiliary poles serves the purpose of saving expensive magnetic material in adaptation to every correspondingly necessary magnetic adhesion. The friction gear can further be modified so that the poles 52, 54, 56, 73, 74 are of different heights and the off-drive rollers 69, 70, 71, 72 are different diameters thus rotating at a different number of revolutions.

Figure 13:
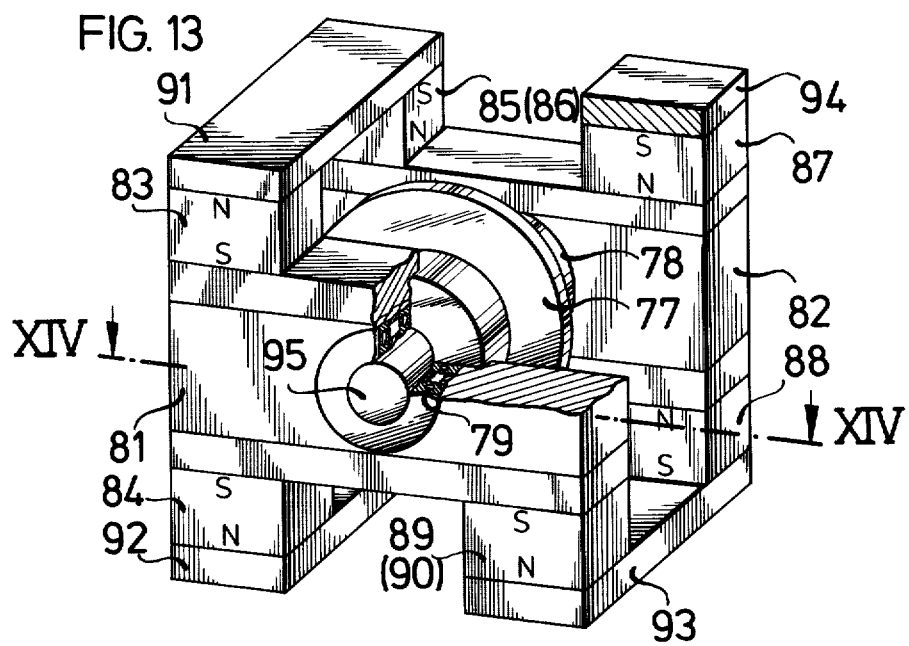
Figure 14:
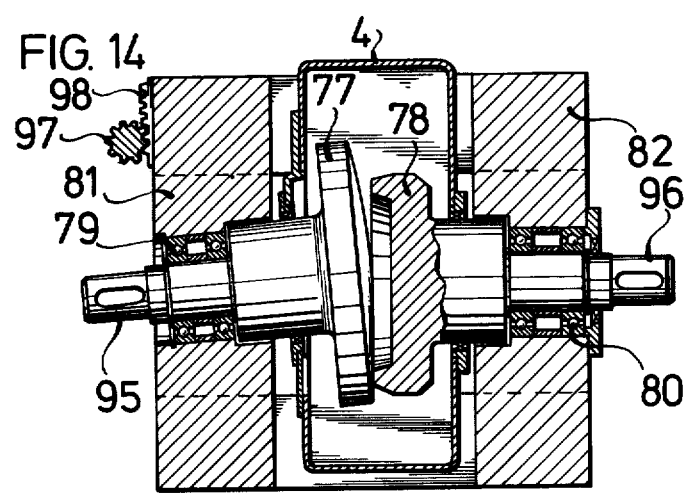

The friction gear of FIGS. 13 and 14 consists of one drive element 77 and one off-drive element 78 each, both being mounted outside the casing 4 with the bearings 79, 80 being mounted in pole shoes 81, 82 of the magnetic system and one of the pole shoes 81, 82—in the given example pole shoe 81—being partly displaceable by means of a pinion 97 and toothed rack 98 out of the magnetic system. The drive element 77 comprises a crowned roll-off surface. Same can also be provided for with the off-drive element 78 instead of with the drive element 77, or with both elements 77, 78. Each pole shoe 81, 82 is disposed between four block magnets 83, 84, 85, 86 and 87, 88, 89, 90 which on their part by means of the short-circuit plates 91, 92, 93, 94 lie as pairs of magnets against the pole shoes 81, 82 with opposite poles, thus being connected to form a closed magnetic system. Each pole shoe 81, 82 receive a fourfold analogous polarization being transmitted to the drive element 77 and off-drive element 78 via the axes 95, 96, with these elements 77, 78 being at their areas of contact exposed to a strong opposite magnetic attraction, due to the mutually opposite polarities of the pole shoes 81, 82. The rotational speed of this friction gear is adjustable by the displacement of the pole shoes 81.

As can be taken from FIGS. 15 and 16, a further modification of the friction gear consists of arranging several block magnets 100 with pole shoes 101 each at the inner periphery of one cylindrical or polygonal short-circuit plate 99, 102 each. An off-drive roller 103 is assigned to each block magnet 100, the axis 104 of said roller being mounted in the casing 4, connecting the short-circuit plates 99, 102 via pole shoes 101 and block magnets 100. All off-drive rollers 103 are driven by one single drive roller 105 being supported in the center of the short-circuit plates 99, 102 in the bearing 106 at the side of the casing. As the block magnets 100 are arranged in the short-circuit plates 99, 102 with alternating poles, and the axes 104 always only connect analogous poles of the block magnets 100 or their pole shoes 101 respectively, the polarity of the off-drive rollers 103 alternates. The air gaps between the off-drive rollers 103 are bridged by the contact of the off-drive rollers 103 with the drive roller 105, i.e. the magnetic field is short-circuited and the tangent elements are thus exposed to a strong magnetic attraction. Said friction gear can for instance be used as multiple spindle boring mill in case of which boring heads 107 can be mounted on the elongated axes 104. In addition, the off-drive rollers 103 can be of different diameter according to the destination of the friction gear, so that the rollers 103 rotate at different speeds. If desired, the friction gear can be run in such a way that the off-drive rollers 103 with analogous diameters are actuated as drive rollers, and the drive rollers 105 as off-drive rollers. The friction gear would in that case have the inverse function to what was described above. The driving force is then concentrated to a larger off-drive roller and can correspondingly be used for great and greater boring performances.

The magnetic system according to the invention can be applied with equal success in case of multiple stage change-over gears if they operate on the basis of a friction gear.

During recent years oil companies working in this field have developed special lubricants, particularly of synthetic type, for improving the lubricated friction, said lubricants being known under the name of traction-liquids. The special character of these traction-liquids resides in the fact that they do not only act as good lubricants but have an extremely improving effect upon friction gear transmissions at the surfaces of contact of two or several bodies with extremely high pressure up to 5000 N/mm$^2$ (N=Newton units) or about 502 kp/mm$^2$ forming at these points by temporary solidification of the usually adequately liquid lubricating film. After passing the point of pressure the lubricating film again liquefies. By means of that recent development in the field of lubricant-research for instance the construction of mechanical continuous friction gears has again become attractive for the achievement of higher performances. Said oil can contribute to the further improvement of friction gears also with the magnetic friction wheels according to the invention.

What is claimed is:

1. A friction gear permanent magnetic entrainment means for rolling transmission of motion in combination with a magnetic-technical system having one magnetic circuit comprising at least two magnets and at least one operating air gap, said magnetic circuit including a frame being composed of symmetrically arranged permanent magnets and symmetrically arranged mild iron or steel parts arranged between analogous poles of the magnets forming central frontal surfaces drawn into the interior of the frame, which central frontal surfaces oppose one another forming an operating gap with opposite polarities in the direction of magnetizing, including drive rollers and off-drive rollers disposed in a common casing, said drive rollers being supported on axes which form oppositely polarized elements of a magnetic circuit closing the magnetic system, block magnets and associated pole shoes located outside of said casing and forming a part of said magnetic-technical system, said axes being connected to said block magnets and their associated pole shoes, said block magnets and associated pole shoes being mounted on both sides of frontal surfaces of said drive rollers, and said axes being secured by said pole shoes.

2. A friction gear according to claim 1, which includes two separate spaced cylindrical or polygonal short-circuit plates, several block magnets with associated pole shoes being mounted on the inner periphery of each of said cylindrical or polygonal short-circuit plates, with an off-drive roller being associated with each block magnet and pole shoe, the axis of said roller connecting the short-circuit plates via the pole shoes and the block magnets and all off-drive rollers being of the same or different diameter, said off-drive rollers having a common drive roller.

3. A friction gear according to claim 1, which includes two separate spaced cylindrical or polygonal short circuit plat es, several block magnets with associated pole shoes being mounted on the interior periphery of each of said cylindrical or polygonal short-circuit plates with a drive roller being associated with each block magnet and pole shoe, said drive rollers being of equal diameter, the axis of said roller connecting the short-circuit plates via the pole shoes and the block magnets and all drive rollers driving one single off-drive roller being mounted in the center of the short-circuit plates.

4. A friction gear according to claim 1, wherein three drive rollers are disposed with the pole shoes being U-shaped and their legs forming auxiliary poles to which the two outside disposed drive rollers are connected via their axes.

5. A friction gear according to claim 1, wherein the block magnets are magnetized in parallel to the plane of axis of the rollers.

6. A friction gear according to claim 1, wherein the block magnets are oppositely magnetized to one another vertically to the plane of axis and connected by a short-circuit plate at the side opposite the pole shoes.

7. A friction gear according to claim 6, wherein a switching element is disposed between the block magnets and the pole shoes, respectively, for short-circuiting the magnetic circuit.

8. A friction gear according to claim 6, wherein the drive rollers are disposed closely adjacent with their peripheries.

9. A friction gear according to claim 6, 7 or 8, wherein additional block magnets with analogous poles are mounted in the pole shoes, the free poles of said additional block magnets being connected to a short-circuit plate.

10. A friction gear according to claim 9, wherein two further drive rollers are mounted above the off-drive roller with their axes being disposed within the casing and connected to those pole shoes having said analogous poles.

11. A friction gear according to claim 6, wherein two conical drive rollers are provided with a friction roller being displaceable between same for the continuous modification of the rotational speed.

12. A friction gear according to claim 6, 7 or 8, wherein more than two drive rollers are arranged side-by-side and are provided for driving two or more off-drive rollers.

13. A friction gear according to claim 12, wherein every second pole is an auxiliary pole, with the poles being disposed so that they may have different heights and the off-drive rollers different diameters.

14. A friction gear permanent magnetic entrainment means for rolling transmission of motion in combination with a magnetic-technical system having one magnetic circuit comprising at least two magnets and at least one operating air gap, said magnetic circuit including a frame being composed of symmetrically arranged permanent magnets and symmetrically arranged mild iron or steel parts arranged between analogous poles of the magnets forming central frontal surfaces drawn into the interior of the frame, which central frontal surfaces oppose one another forming an operating gap with the opposite polarities in the direction of magnetizing, at least two rollers having one drive and one off-drive, mounted outside the frame, pole shoes associated with said magnets, said magnets and pole shoes forming a part of the magnetic system, bearings arranged in the pole shoes, and at least one pole shoe being laterally displaceable out of the magnetic system.

15. A friction gear according to claim 14, wherein at least one of the said one drive or off-drive element is crowned at the roll-off surface.

16. A friction gear according to claim 14, wherein each pole shoe is disposed between separate sets of four block magnets said sets of four block magnets being in pairs connected to their free poles via short-circuit plates vertically to their associated pole shoes.

* * * * *